United States Patent [19]
Damusis

[11] Patent Number: 5,516,120
[45] Date of Patent: May 14, 1996

[54] TWO LAYER COMBUSTION FLANGE

[75] Inventor: John A. Damusis, Naperville, Ill.

[73] Assignee: Dana Corporation, Toledo, Ohio

[21] Appl. No.: 209,183

[22] Filed: Mar. 10, 1994

[51] Int. Cl.⁶ ..................................................... F16J 15/12
[52] U.S. Cl. .................... 277/9; 277/234; 277/235 B
[58] Field of Search .............................. 277/9, 233, 234, 277/235 B, 180, 235 A

[56] References Cited

U.S. PATENT DOCUMENTS

| | | | |
|---|---|---|---|
| 2,695,186 | 11/1954 | Balfe | 277/235 B |
| 3,191,950 | 6/1965 | Hiltner | 277/180 |
| 3,425,677 | 2/1969 | White, Jr. | 277/234 |
| 3,565,449 | 2/1971 | Ascencio | 277/235 B |
| 4,331,336 | 5/1982 | Czernik et al. | 277/235 B |
| 4,335,890 | 6/1982 | Nicholson | 277/235 B |
| 4,465,287 | 8/1984 | Bindel et al. | 277/235 |
| 4,471,968 | 9/1984 | Schlaupitz et al. | 277/235 |
| 4,721,315 | 1/1988 | Ueta | 277/235 |
| 4,776,073 | 11/1988 | Udagawa | 29/156.4 |
| 5,039,117 | 8/1991 | Göhrlich et al. | 277/235 |
| 5,340,126 | 8/1994 | Antonini et al. | 277/235 B |
| 5,375,856 | 12/1994 | Ishikawa et al. | 277/235 B |

FOREIGN PATENT DOCUMENTS

| | | | |
|---|---|---|---|
| 2347321 | 3/1975 | Germany | 277/235 B |
| 2803932 | 8/1979 | Germany | 277/235 B |
| 60-50257 | 3/1985 | Japan | 277/235 B |
| 1525694 | 9/1978 | United Kingdom | 277/235 B |
| 1576998 | 10/1980 | United Kingdom | 277/235 B |

Primary Examiner—William A. Cuchlinski, Jr.
Assistant Examiner—John L. Beres
Attorney, Agent, or Firm—Dykema Gossett

[57] ABSTRACT

A flange assembly adapted to be used in a gasket having an opening with an inner peripheral boundary including two flanges. Formed using a generally non-malleable metal, the flanges generally correspond to the shape of the boundary of the gasket body opening. Each of the flanges include a radially outer edge and a radially inner edge, an inner surface of each of the flanges adapted to be secured to the gasket body. The flanges may be mechanically or chemically secured to the gasket body. In one embodiment, the flange assembly includes a separate sealing element such as a wire ring. The inner edges of the flanges extend inwardly of the boundary of the gasket body to define a channel adapted to receive the sealing element.

21 Claims, 1 Drawing Sheet

TWO LAYER COMBUSTION FLANGE

FIELD OF THE INVENTION

The present invention relates to a gasket and more particularly to a flange assembly positioned adjacent a high temperature bore opening formed in a gasket body.

BACKGROUND OF THE INVENTION

High temperature resistant gaskets are used to provide a seal against combustion gases at elevated temperatures. Such gaskets include cylinder head gaskets, exhaust manifold gaskets and turbocharger base gaskets. In particular, cylinder head gaskets typically extend around annular cylinder bores to provide a combustion seal, maintaining the high temperature gases of combustion within the cylinder bore. The gasket bears the load from a bolted connection of the engine block and cylinder head components and relies upon that load to provide a seal.

It is known to provide cylinder head gaskets with a single flange positioned adjacent a cylinder bore opening formed in a gasket body of the gasket. The flange is generally U-shaped in cross-section, having a central web portion separating upper and lower legs that extend continuously around an inner peripheral boundary of the cylinder bore opening and engage upper and lower surfaces of the gasket body. Typically, a sealing element such as a fire ring is disposed within a trough defined by the U-shaped cross-section of the flange to help protect the gasket body from the deleterious effects of the combustion environment.

Up to 30 percent of the clamping force from the bolted connection of the mechanical components is used to secure such flanges to the gasket body. Thus, this portion of the clamping force is not available to prevent leakage from the various seals. A high force is necessary due to the relatively large contact area between the mechanical components and the flange legs.

Moreover, U-shaped flanges are associated with high tooling and manufacturing costs. The sealing element must be manually loaded into the U-shaped trough. Then a closing die must be used that forms and presses the flange legs over the sealing element and the gasket body. A flattening operation is then required that must be inspected to confirm that the flange is at a pre-established height. Such operations restrict the construction of the U-shaped flanges to malleable metals.

The use of malleable metals in U-shaped flanges promotes flange thinning at flange/sealing element interfaces. Additionally, flange cracking may occur either during forming operations or in actual engine operation. U-shaped flanges are particularly susceptible to cracking in the central web portion between the upper and lower legs of the flange.

Further, by enclosing the sealing element within a U-shaped flange, the sealing element may not be visually inspected. Inspections using expensive electronic equipment have had only limited success.

SUMMARY OF THE INVENTION

A disclosed high temperature resistant gasket such as a cylinder head gasket includes a cylinder bore opening formed in a gasket body of the gasket, the opening having a generally annular boundary. A combustion flange assembly comprises two separate flanges disposed adjacent to the boundary of the cylinder bore opening. The flange assembly includes an upper flange with a radially outer edge and a radially inner edge, an inner surface of the upper flange engaging an upper surface of the gasket body. Similarly, the flange assembly includes a lower flange with a radially outer edge and a radially inner edge, an inner surface of the lower flange engaging a lower surface of the gasket body.

Each of the flanges is mechanically or chemically secured to the gasket body. In a preferred embodiment, each of the flanges includes equally circumferentially spaced tabs extending radially outwardly from the outer edge. The flanges, disposed on opposite sides of the gasket body, are aligned so that a single mechanical fastener such as a rivet may be used to secure corresponding tabs to the gasket body. Tabs are not required when the flanges are chemically secured to the gasket body. Instead an adhesive such as a thermosetting adhesive is disposed between an inner surface of a flange and a corresponding surface of the gasket body.

In one embodiment, the gasket body is made from a high temperature resistant material such as expanded graphite. Thus, there is a reduced need to protect the boundary of the gasket body. Therefore, the inner edges of the flanges are generally flush with the bore opening boundary.

In another embodiment, the flange assembly includes a separate sealing element. The inner edges of the flanges extend radially inwardly of the boundary of the gasket body to define a channel adapted to receive the sealing element.

Costly flange forming and attachment operations and related tooling are eliminated using the present invention. Instead, the flanges are typically stamped. Further, stronger and harder generally non-malleable metals may be used to make the flanges. Such metals resist flange thinning, particularly in regions of contact with the optional sealing element. If softer malleable metals are used, their surfaces may be induced with compressive stresses to reduce fatigue and corrosion related failures. Further, the flanges may be contoured for suitable load distribution and to minimize opening distortions. Anti-fretting coatings may also be used.

Additionally, virtually none of the available clamping force is required for the operation of the flange assembly. There is also reduced manufacturing uncertainty. Yet another advantage is that the inventive flange assembly permits visual inspection of an installed sealing element.

BRIEF DESCRIPTION OF THE DRAWINGS

The features and inventive aspects of the present invention will become more apparent upon reading the following detailed description, claims, and drawings, of which the following is a brief description:

DETAILED DISCLOSURE OF PREFERRED EMBODIMENTS

Figure 1:
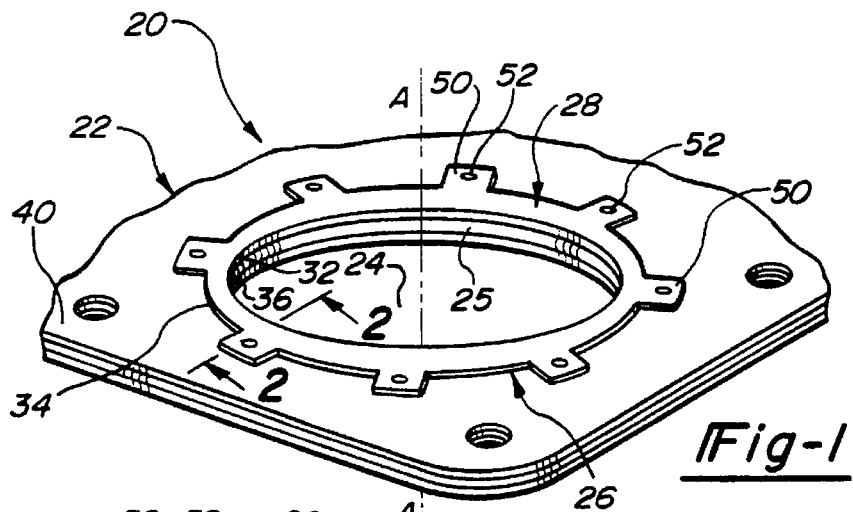
FIG. 1 is a perspective view of a first embodiment of a gasket with a two-piece flange assembly mechanically secured to a gasket body.

A gasket 20 illustrated in FIG. 1 includes a gasket body 22 and a high temperature bore opening 24 having an inner peripheral boundary 25 about an axis A—A. As shown, boundary 25 is generally annular. In the illustrated embodiment, gasket 20 is a cylinder head gasket, and provides a seal around a cylinder head bore for a spark-ignition engine. The present invention may also be used in other high temperature environments such as that experienced with an exhaust manifold or with a turbocharger base. Temperatures experienced by gasket 20 will generally exceed 500 degrees Fahrenheit (260 degrees Celsius).

Figure 2:
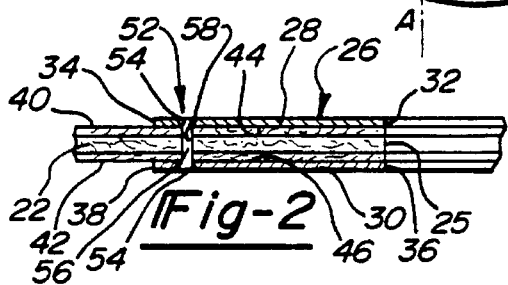
FIG. 2 is a cross-sectional view of the first embodiment of the gasket as shown by lines 2—2 of FIG. 1.

As shown in FIGS. 1 and 2, gasket 20 includes a two-piece annular flange assembly 26 adapted to correspond to the shape of and disposed adjacent boundary 25 of gasket body 22. Assembly 26 comprises an upper flange 28 and a lower flange 30. Flange 28 includes a radially inner edge 32 and a radially outer edge 34. Similarly, flange 30 includes a radially inner edge 36 and a radially outer edge 38. Gasket body 22 has an upper surface or side 40 and a lower surface or side 42. An inner surface 44 of upper flange 28 engages upper surface 40 of body 22 while an inner surface 46 of lower flange 30 engages a lower surface 42 of body 22.

Flanges 28 and 30 may be either mechanically or chemically secured to gasket body 22. The flanges are intended to be secured during gasket installation. Once installed, loads exerted by mating components sealed by gasket 20 will assist in maintaining flanges 28 and 30 in position.

In the illustrated embodiment, eight equally circumferentially spaced tabs 50 extend radially outwardly from the outer edge 34 of flange 28. Fewer or greater numbers of tabs 50 and asymmetrical circumferential spacing may also be used. A mechanical fastener 52 such as a rivet passes through an aperture 54 formed in a number of tabs 50 to secure the corresponding flange to gasket body 20. Tabs 50 are preferred when using mechanical fasteners 52 so that each fastener 52 does not interfere with the sealing function performed between inner edge 32 and outer edge 34 of flange 28 and between inner edge 36 and outer edge 38 of flange 30. Flanges 28 and 30 preferably share an equal number of tabs 50 with the identical circumferential spacing. Thus, tabs 50 of flanges 28 and 30 may be aligned on opposite sides 40 and 42 of gasket body 22 so that a single mechanical fastener 52 may engage a corresponding tab of each of the flanges 28 and 30 to secure the flanges to the gasket body. A common aperture 56 is formed in gasket body 22 to receive a shaft 58 of mechanical fastener 52.

Tabs 50 are not required when flanges 28 and 30 are chemically secured to gasket body 22. Instead, as shown in the embodiment of FIG. 3, an adhesive 60 such as a thermosetting adhesive is disposed between inner surface 44 of flange 28 or inner surface 36 of flange 30 and either upper surface 40 or lower surface 42 of gasket body 22.

Figure 3:
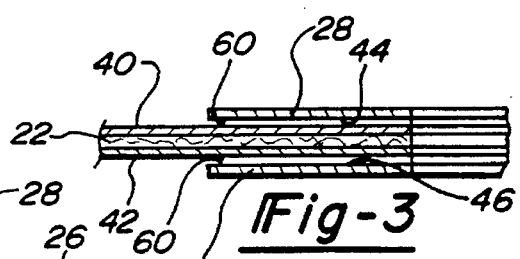
FIG. 3 is a cross-sectional view of a second embodiment of a gasket with a two-piece flange assembly secured to a gasket body using an adhesive.

In the embodiments of FIGS. 1–3, inner edge 32 of flange 28 and inner edge 36 of flange 30 are generally flush with boundary 25 of opening 24. With the advent of high temperature resistant gasket body constructions which include a preferred material such as expanded graphite, there is a reduced need for flange assembly 26 to protect boundary 25 of gasket body 22. Such a gasket is typically not very dense. Therefore, to distribute applied load, the radial distance between inner edge 32 and outer edge 34 of flange 28, and inner edge 36 and outer edge 38 of flange 30 will typically be greater than if a denser gasket body material is used. Thus, the radial width of flanges 28 and 30 will depend in part on the construction of gasket body 22.

Figure 4:
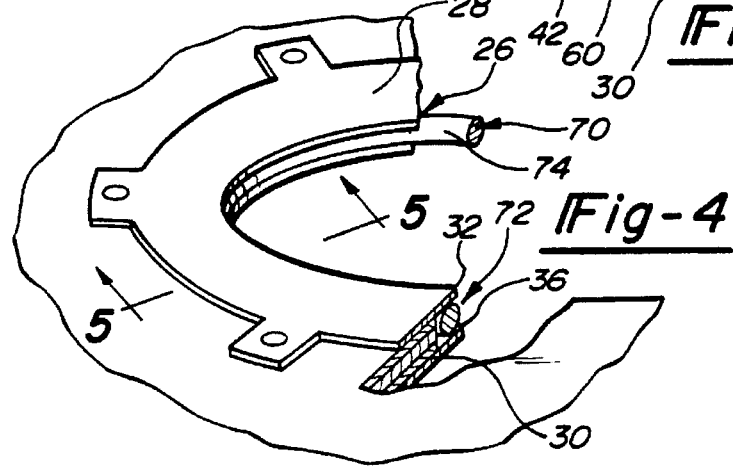
FIG. 4 is a perspective view of a third embodiment of a gasket wherein the flange assembly includes a sealing element.
Figure 5:
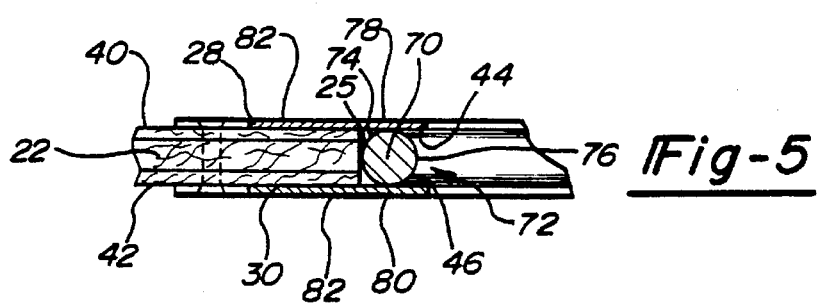
FIG. 5 is a cross-sectional view of the third embodiment of the gasket as shown by lines 5—5 of FIG. 4.

As illustrated in FIGS. 4 and 5, however, flange assembly 26 may include a separate sealing element 70. Sealing element 70 is most likely to be used in an environment experienced by cylinder head gaskets of compression-ignition engines or when design considerations disfavor the use of a high temperature resistant gasket body 22. One possible sealing element 70 includes a wire fire ring, as shown. Another possible sealing element includes an embossed sealing element such as that formed by flat metal worked to create an upset. Inner edge 32 of flange 28 and inner edge 36 of flange 30 extend radially inwardly of boundary 25 of gasket body 22 to define a channel 72 adapted to receive sealing element 70. A portion of inner surface 44 of flange 28 and a portion of inner surface 46 of flange 30 engage an outer periphery 74 of sealing element 70 to retain the sealing element in position. Inner edges 32 and 36 of flanges 28 and 30 preferably extend radially inwardly a short distance beyond a radially inner edge 76 of the sealing element.

Costly flange forming and attachment tools and related forming operations associated with conventional U-shaped flanges are eliminated using the present invention. Flanges 28 and 30 may be stamped or blanked. Further, because special forming operations are not undertaken, much stronger and harder metals may be used to make flanges 28 and 30. For example, flanges 28 and 30 may be made from stainless steel such as 301 stainless steel, or high temper steels. Such metals resist flange thinning, of particular importance at regions of contact with sealing element 70. If softer metals are used, the surfaces of the softer metals can be induced with compressive stresses through rolling or shot peening operations. Induced compressive stresses reduce the potential for fatigue or corrosion failures. Flanges 28 and 30 may be contoured for suitable load distribution around bore opening 24 and related openings to minimize opening distortions. Contouring options include varying the axial thickness of either flange 28 or flange 30 as well as the radial extent of a flange from an inner edge to an outer edge. Thus, flanges 28 and 30 may be easily customized for a particular gasket configuration.

An additional advantage is that virtually none of the available clamping force of mating components is required for the operation of flange assembly 26. Thus, much greater force is available for gasket sealing. Better sealing also results because of a reduced manufacturing uncertainty. A very tight manufacturing tolerance exists for each of the opposed legs in the prior art U-shaped flange. Yet another advantage is that if a sealing element 70 is used, the inventive flange assembly 26 allows visual inspection of the installed sealing element.

Flange surfaces, particularly an outer surface 78 of flange 28 and an outer surface 80 of flange 30 may be treated with an anti-fretting increased lubricity coating 82. Typical coatings 82 include polytetrafluoroethylene or molybdenum disulfide. Coatings 82 reduce wear to flange assembly 26 and extend the life of gasket 20.

Preferred embodiments of the present invention have been described. Variations and modifications may be employed without departing from the scope of the present invention. Accordingly, the following claims should be studied to learn the true scope of the present invention.

What I claim is:

1. A gasket used in high temperature operation comprising:
   a gasket body with an upper surface and a lower surface having at least one opening, said opening having an inner peripheral boundary; and
   a flange assembly with two flanges generally shaped to correspond to said boundary disposed adjacent said boundary, said flange assembly including an upper flange with a radially outer edge and a radially inner edge, an inner surface of said upper flange engaging said upper surface of said gasket body, and a lower flange with a radially outer edge and a radially inner edge, an inner surface of said lower flange engaging said lower surface of said gasket body, each of said upper and lower flanges being secured to said gasket body, wherein a plurality of tabs extend radially outwardly from said outer edge of at least one of said flanges, a mechanical fastener being used in conjunction with a number of said tabs to secure said at least one of said flanges to said gasket body.

2. A gasket as recited in claim 1, an aperture passing through said number of said tabs, said mechanical fastener extending through said aperture to engage said gasket body.

3. A gasket as recited in claim 1, wherein said number of said tabs are equally circumferentially spaced about said outer edge of said each of said flanges.

4. A gasket as recited in claim 3, wherein said number of said tabs of said flanges are aligned on opposite sides of said gasket body, said mechanical fastener engaging a corresponding aligned tab of said each of said flanges to secure said tabs to said gasket body.

5. A gasket as recited in claim 4, wherein said mechanical fastener comprises a rivet.

6. A gasket as recited in claim 1, wherein said inner edge of each of said flanges is generally flush with said boundary of said opening.

7. A gasket as recited in claim 1, wherein said inner edges of each of said flanges extend inwardly of said boundary to define a channel, a sealing element extending about and being received in said channel, said flanges engaging said sealing element to retain said sealing element in position.

8. A gasket as recited in claim 7, wherein said sealing element is a wire ring.

9. A gasket as recited in claim 1, wherein each of said flanges comprises a generally non-malleable metal.

10. A gasket as recited in claim 9, wherein said metal comprises one of stainless and high tempered metal.

11. A gasket as recited in claim 1, wherein an outer surface of at least one of said flanges includes an anti-fretting coating.

12. A gasket used in high temperature operation comprising:

a gasket body with an upper surface and a lower surface having at least one opening, said opening having an inner peripheral boundary; and a flange assembly with two flanges generally shaped to correspond to said boundary disposed adjacent said boundary, said flange assembly including an upper flange with a radially outer edge and a radially inner edge, an inner surface of said upper flange engaging said upper surface of said gasket body, and a lower flange with a radially outer edge and a radially inner edge, an inner surface of said lower flange engaging said lower surface of said gasket body, each of said upper and lower flanges being secured to said gasket body, wherein a plurality of circumferentially spaced tabs extend radially outwardly from said outer edge of said flanges, a mechanical fastener being used in conjunction with a number of said tabs to secure said flanges to said gasket body, and said number of said tabs of said flanges aligned on opposite sides of said gasket body so that said mechanical fastener engages a corresponding aligned tab of said each of said flanges.

13. A gasket as recited in claim 12, wherein said inner edge of each of said flanges is generally flush with said boundary of said opening.

14. A gasket as recited in claim 12, wherein said inner edges of each of said flanges extend inwardly of said boundary to define a channel, a sealing element extending about and being received in said channel, said flanges engaging said sealing element to retain said sealing element in position.

15. A flange assembly adapted to be used in a gasket with a gasket body having an opening with an inner peripheral boundary, said flange assembly comprising:

an upper flange generally corresponding to the shape of the boundary of the gasket body, said upper flange having an outer edge and an inner edge, and wherein an inner surface of said upper flange is adapted to be secured to the gasket body; and a lower flange generally corresponding to the shape of the boundary of the gasket body, said lower flange having an outer edge and an inner edge, and wherein an inner surface of said lower flange is adapted to be secured to the gasket body, a plurality of circumferentially spaced tabs extending radially outwardly from said outer edge of said flanges.

16. A flange assembly as recited in claim 15, wherein a mechanical fastener is adapted to be used in conjunction with a number of said tabs to secure said flanges to the gasket body, and said number of said tabs of said flanges adapted to be aligned so that said mechanical fastener engages a corresponding aligned tab of each of said flanges.

17. A flange assembly as recited in claim 15, wherein said assembly further comprises a sealing element disposed between said inner surfaces of said flanges, said sealing element adapted to be adjacent to the boundary of the gasket body.

18. A gasket used in high temperature operation comprising:

a gasket body with an upper surface and a lower surface having at least one opening, said opening having an inner peripheral boundary; and a flange assembly with two flanges generally shaped to correspond to said boundary disposed adjacent said boundary, said flange assembly including an upper flange with a radially outer edge and a radially inner edge, an inner surface of said upper flange engaging said upper surface of said gasket body, and a lower flange with a radially outer edge and a radially inner edge, an inner surface of said lower flange engaging said lower surface of said gasket body, each of said upper and lower flanges being secured to said gasket body, said inner edges of each of said flanges extending inwardly of said boundary to define a channel, a sealing element extending about and being received in said channel, said flanges engaging said sealing element to retain said sealing element in position, wherein said sealing element is a wire ring.

19. A gasket as recited in claim 18, wherein an adhesive is disposed between said flanges and said gasket body to secure said flanges to said gasket body.

20. A gasket as recited in claim 19, wherein said adhesive is a thermosetting adhesive.

21. A gasket used in high temperature operation comprising:

a gasket body with an upper surface and a lower surface having at least one opening, said opening having an inner peripheral boundary; and a flange assembly with two flanges generally shaped to correspond to said boundary disposed adjacent said boundary, said flange assembly including an upper flange with a radially outer edge and a radially inner edge, an inner surface of said upper flange engaging said upper surface of said gasket body, and a lower flange with a radially outer edge and a radially inner edge, an inner surface of said lower flange engaging said lower surface of said gasket body, each of said upper and lower flanges being secured to said gasket body, wherein a plurality of tabs extend radially outwardly from said outer edge of at least one of said flanges.

* * * * *